United States Patent
Lewis et al.

(10) Patent No.: US 11,481,202 B2
(45) Date of Patent: Oct. 25, 2022

(54) TRANSFORMATION TEMPLATES TO AUTOMATE ASPECTS OF COMPUTER PROGRAMMING

(71) Applicant: X Development LLC, Mountain View, CA (US)

(72) Inventors: Owen Lewis, Stanford, CA (US); Bin Ni, Fremont, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 17/176,730

(22) Filed: Feb. 16, 2021

(65) Prior Publication Data

US 2022/0261231 A1     Aug. 18, 2022

(51) Int. Cl.
*G06F 8/51* (2018.01)
*G06N 3/04* (2006.01)
*G06N 3/08* (2006.01)
*G06F 8/71* (2018.01)

(52) U.S. Cl.
CPC ............... *G06F 8/51* (2013.01); *G06F 8/71* (2013.01); *G06N 3/04* (2013.01); *G06N 3/08* (2013.01)

(58) Field of Classification Search
CPC .... G06F 8/51; G06F 8/71; G06N 3/04; G06N 3/08
See application file for complete search history.

(56) References Cited

U.S. PATENT DOCUMENTS

| | | | | |
|---|---|---|---|---|
| 7,617,449 B2* | 11/2009 | Carlson | ................. | G06F 40/186 |
| | | | | 715/255 |
| 8,788,935 B1* | 7/2014 | Hirsch | ....................... | G06F 8/10 |
| | | | | 717/106 |
| 10,019,259 B2* | 7/2018 | Araya | ........................ | G06F 8/76 |
| 10,095,511 B1* | 10/2018 | Sengupta | .................. | G06F 8/71 |
| 10,776,721 B1* | 9/2020 | Shi | .......................... | G06N 3/063 |
| 2006/0195436 A1* | 8/2006 | Levesque | .................. | G06F 8/71 |

(Continued)

OTHER PUBLICATIONS

Plaice et al., "A New Approach to Version Control" Apr. 1992. IEEE Transactions on Software Engineering. 14 pp.

(Continued)

*Primary Examiner* — Douglas M Slachta
(74) *Attorney, Agent, or Firm* — Middleton Reutlinger

(57) ABSTRACT

Implementations are described herein for building and/or applying a library of transformation templates to automate migration of source code. In various implementations, pre-migration and post-migration versions of source code that exist prior to and after migration of the source code may be analyzed. Based on the analysis, one or more transformations made to the pre-migration version of the source code to yield the post-migration version of the source code may be identified. A library of transformation templates that are applicable subsequently to automate migration of new source code may be built. In some implementations, for one or more of the transformations, a plurality of candidate transformation templates may be generated with different permutations of tokens being replaced with placeholders. One of the plurality of candidate transformation templates may be selected for inclusion in the library based on one or more criteria.

20 Claims, 7 Drawing Sheets

(56) References Cited

U.S. PATENT DOCUMENTS

| | | | | |
|---|---|---|---|---|
| 2008/0155519 | A1* | 6/2008 | Mulvaney | G06F 8/31 |
| | | | | 717/143 |
| 2013/0227533 | A1* | 8/2013 | Tonkin | G06F 8/51 |
| | | | | 717/137 |
| 2013/0339943 | A1* | 12/2013 | Mallya | G06F 16/214 |
| | | | | 717/176 |
| 2016/0132308 | A1* | 5/2016 | Muldoon | G06F 8/447 |
| | | | | 717/137 |
| 2018/0349109 | A1* | 12/2018 | Brown | G06N 20/00 |
| 2019/0361684 | A1* | 11/2019 | Carvalho | G06F 8/658 |
| 2020/0097261 | A1* | 3/2020 | Smith | G06N 3/084 |
| 2020/0150953 | A1* | 5/2020 | Smith | G06F 8/75 |
| 2020/0311352 | A1* | 10/2020 | Miura | G06N 3/049 |
| 2020/0319879 | A1* | 10/2020 | Ghosh | G06F 8/61 |
| 2021/0011694 | A1* | 1/2021 | Ni | G06N 20/00 |
| 2021/0149650 | A1* | 5/2021 | Hadi Salim | G06F 8/38 |
| 2021/0165647 | A1* | 6/2021 | Krishnamoorthy | G06F 8/65 |

OTHER PUBLICATIONS

Levin et al., "Boosting Automatic Commit Classification Into Maintenance Activities by Utilizing Source Code Changes" arXiv:1711.05340v1 [cs.SE] Nov. 14, 2017.

Ronald J. Williams, "Version Space Learning" CSG220: Machine Learning, Spring 2007. 17 pp.

Alrubaye et al., "Learning to Recommend Third-Party Library Migration Opportunities at the API Level" Applied Soft Computing. vol. 90. 11 pages, dated May 2020.

* cited by examiner

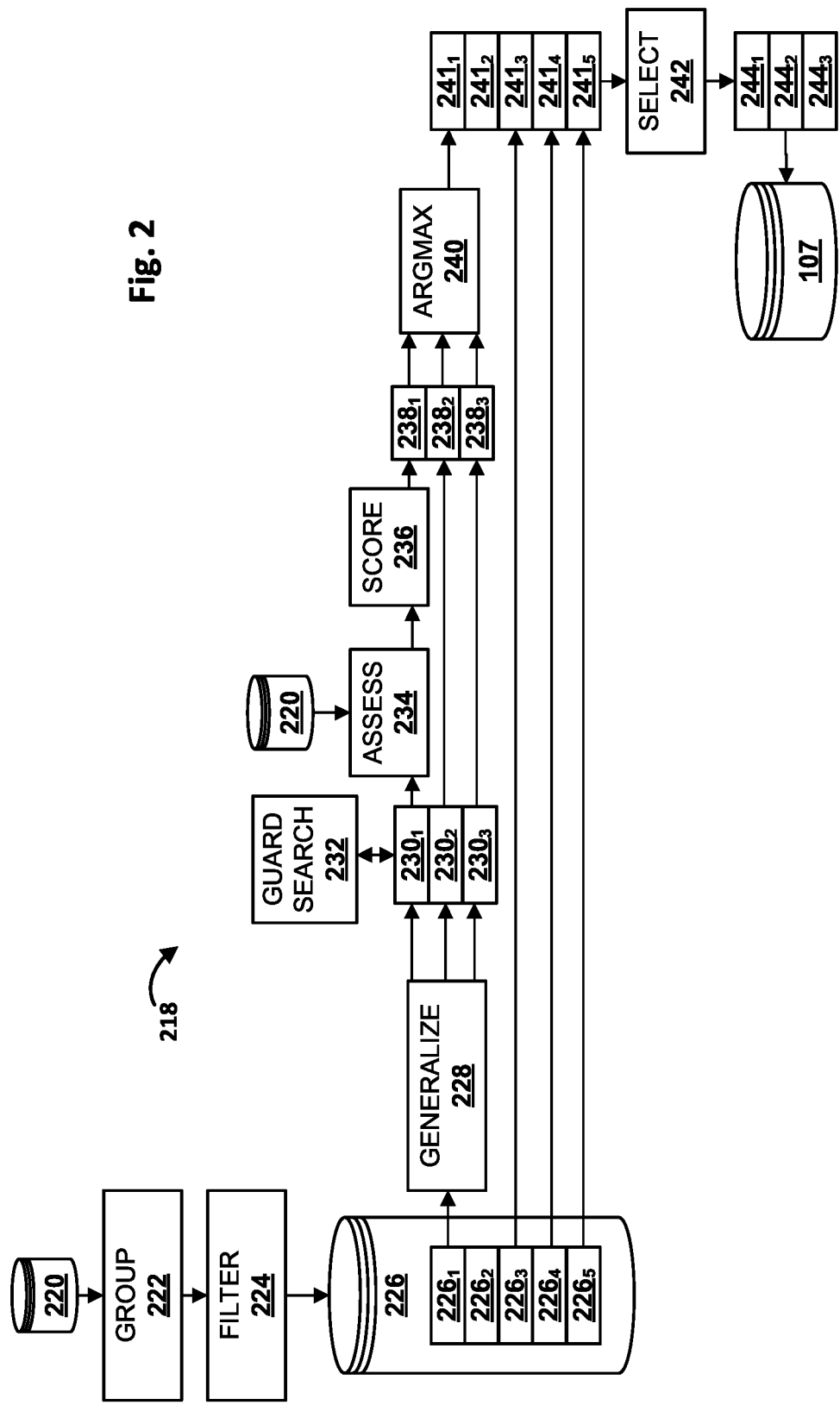

AUTO EDIT RECOMMENDATIONS

GIVEN YOUR PREFERENCES, WE HAVE IDENTIFIED A
NUMBER OF PATTERNS IN THE SOURCE CODE THAT WE
RECOMMEND UPDATING AUTOMATICALLY. PLEASE SELECT
A FILENAME TO BE TAKEN TO THE FIRST FOUND
PATTERN IN THAT FILE, OR SELECT AN INDIVIDUAL
FOUND PATTERN TO BE TAKEN DIRECTLY TO THE SOURCE
CODE SNIPPET IN QUESTION.

FOO.CC
    XRANGE(X)→RANGE(X)
    X.KEYS(Y)→LIST(X.KEYS(Y))
BAR.CC
    XRANGE(X)→RANGE(X)
    X.XRANGE(Y)→LIST(X.RANGE(Y))
    XRANGE(X)→RANGE(X)
    XRANGE(X, Y)→RANGE(X, Y)

TRANSFORMATION TEMPLATES TO AUTOMATE ASPECTS OF COMPUTER PROGRAMMING

BACKGROUND

Source code maintenance often includes migration of source code, which is time consuming and expensive. Some large code bases may require numerous years' worth of engineer and/or programmer time in order to be migrated from one version to another. This type of work is often considered tedious and/or cumbersome, which may lead to mistakes being made and/or failure to implement transformations that are critical to the migration.

SUMMARY

Implementations are described herein for building and/or applying a library of transformation templates to automate migration of source code. In some implementations, the library of transformation templates may be built during a training phase then applied to new source code during an inference phase. During training, "training" source code bases that have undergone previous migrations may be analyzed to identify and learn source code transformations (e.g., edits). These learned transformations may be a foundation for capturing software developers' skills and/or institutional knowledge, as well as for learning how various types of source code has evolved over time. In various implementations, the learned transformations may be generalized to form what will be referred to herein as "transformation templates," which are rules for transforming source code snippets. Transformation templates may be represented in various ways, such as pairs of code snippets, one predecessor and the other successor, and/or as pairs of graphs, again one predecessor and the other successor. In the latter case, each graph may take various forms, such as an abstract syntax tree (AST) or a control flow graph (CFG). These transformation templates may be applied subsequently to matching snippet(s) of new source code that is targeted for migration, e.g., so that the new source code can be at least partially migrated with little to no human effort.

In various implementations, two versions of source code, one pre-migration and one post-migration, may be analyzed to identify transformation(s) made to the pre-migration version to yield the post-migration version. In some such implementations, various techniques for aligning source code may be applied first, e.g., to ensure that a post-migration source code snippet in fact corresponds to a pre-migration source code snippet.

In some implementations, multiple candidate transformation templates (alternatively referred to as "candidate generalizations") may be generated for each identified transformation. Each candidate transformation template may be a variation or permutation of the transformation in which different tokens are replaced with what will be referred to herein as "placeholders" or "wildcards," while other tokens are preserved. Suppose the snippet xrange(6) is transformed during migration to range(6). This transformation could be represented by multiple different candidate transformation templates, each having a different combination of placeholders (Z, Y, and X below) and preserved tokens, such as the following:

xrange(Z)→range(Z);
Z(6)→Y(6);
Z(X)→(X);

The first candidate transformation template would match any instance of the xrange( ) function with argument(s) passed to it, and replace it with range( ) while preserving the argument(s). The second candidate transformation template would match any instance of a function that includes, as a single argument, the number 6. The third candidate transformation template would match any instance of any function that includes any argument(s).

Based on a human programmer's intuition it would be clear immediately that the first candidate transformation template is the best choice of the three for inclusion in the library of subsequently-applicable transformation templates, and the last candidate transformation template would be entirely too broad to be useful. On the other hand, for an intuition-lacking data processing device (e.g., a computer) to choose from these candidate transformation templates, various criteria can be provided for analysis. In some implementations, the criteria may include preservation of programming language built-in keyword(s) in and/or across the candidate transformation template. Programming language built-in keywords such as function names or other operators—especially if imported from standard or commonly-used application programming interfaces (APIs)—may be particularly important to preserve. Function arguments, on the other hand, may be transient between different instances of the same function call.

Other criteria may be provided to determine which candidate transformation template should be selected for inclusion in the library. In some implementations, these criteria may include successful application of the candidate transformation template to a pre-migration version training source code snippet to accurately generate a post-migration version of the training source code snippet. If the candidate transformation does not properly transform some other sampled source code snippet from a pre-migration version to a post-migration version, that candidate transformation template can be discarded or a score associated with it may be decremented. As another example, the criteria may include a count of transformations being implementable using the candidate transformation template. One broader candidate transformation template that is applicable to multiple source code snippets may be more likely selected than a narrower candidate transformation template that is only applicable to a single source code snippet.

In some implementations, transformations detected in the training source code may be grouped into clusters based on similarity. Transformation templates may then be generated on a cluster-to-cluster basis, rather than on an individual transformation basis. In some such implementations, the training source code and/or pertinent snippets thereof (e.g., transformations and immediately surrounding contextual code) may be preprocessed for clustering purposes. For example, tokens of the transformation (and surrounding contextual code if present) may be encoded into embeddings, e.g., using techniques such as word2vec or a Bidirectional Encoder Representations from Transformers (BERT).

In some implementations, these embeddings may be further encoded to include structure (e.g., syntactic or semantic) of the source code itself. For example, a graph representation of the source code, such as an abstract syntax tree (AST) or control flow graph (CFG), may be generated. A graph-based machine learning model such as a graph neural network (GNN) may be applied to the graph representation to generate another embedding that encodes both semantics and structure of the original source code transformation. The resulting embedding may be grouped into a cluster with similar embeddings representing similar transformations. This cluster may then be leveraged to generate a transformation template that is applicable to any source code that maps to the cluster.

In some implementations, a method implemented using one or more processors may include: analyzing pre-migration and post-migration versions of source code that exist prior to and after migration of the source code; based on the analyzing, identifying one or more transformations made to the pre-migration version of the source code to yield the post-migration version of the source code; and building a library of transformation templates that are applicable subsequently to automate migration of new source code. In various implementations, the building may include, for one or more of the transformations: generating a plurality of candidate transformation templates, wherein for each candidate transformation template, different permutations of tokens of the transformation are replaced with placeholders, and selecting one of the plurality of candidate transformation templates for inclusion in the library of transformation templates, wherein the selecting is based on one or more criteria.

In various implementations, the library may include a lattice of transformation templates. In various implementations, the one or more criteria may include successful application of the candidate transformation template to a pre-migration version training source code snippet to accurately generate a post-migration version of the training source code snippet.

In various implementations, the one or more criteria may include preservation of a programming language keyword in the candidate transformation template. In various implementations, the one or more criteria may include a count of the transformations being implementable using the candidate transformation template.

In various implementations, the one or more transformations may include a plurality of transformations, and the method may further include: grouping the plurality of transformations into a plurality of clusters; generating a plurality of candidate transformation templates for a given cluster of the plurality of clusters, and selecting, based on one or more of the criteria, one of the plurality of candidate transformation templates generated for the given cluster for inclusion in the library of transformation templates. In various implementations, the grouping may include encoding each transformation of the plurality of transformations into an embedding. In various implementations, the encoding may be based on a transformer network and a graph neural network (GNN).

In various implementations, one or more of the transformations may include contextual code surrounding the transformation. In various implementations, the method may include analyzing a pre-migration version of the new source code to match one or more transformation templates from the library to one or more snippets of the new source code; and applying the matched one or more transformation templates to the one or more snippets of the new source code to generate a post-migration version of the new source code.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 schematically demonstrates an example of how aspects of the present disclosure may be implemented, in accordance with various implementations.

FIG. 3 depicts an example graphical user interface (GUI) that may be presented in accordance with various implementations described herein.

DETAILED DESCRIPTION

Figure 1:
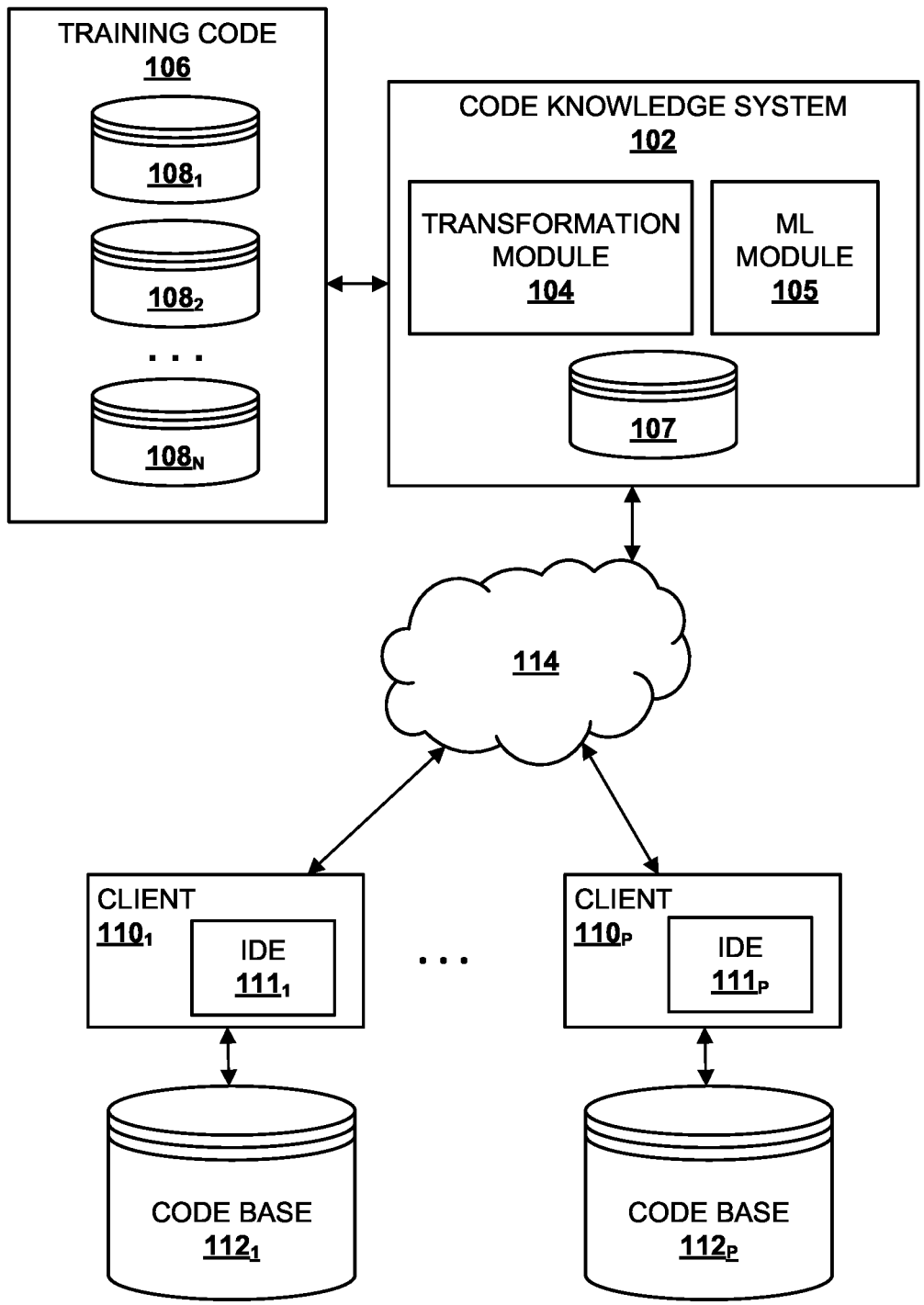
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs", tensor processing units or ("TPUs")) that execute computer-readable instructions stored in memory, or other types of logic such as application-specific integrated circuits ("ASIC"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure," although this is not required.

A code knowledge system 102 may be operably coupled with clients 1101-P via one or more computer networks (114) to help clients 110$_{1-P}$ manage their respective code bases 112$_{1-P}$. In other implementations, code knowledge system 102 may be implemented locally at a client 110. Code knowledge system 102 may include, among other things, a transformation module 104 that is configured to perform selected aspects of the present disclosure in order to help one or more clients 110$_{1-P}$ to manage and/or make changes to one or more corresponding code bases 112$_{1-P}$. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth.

Transformation module 104 may be configured to leverage prior source code transformations contained in training code 106 to facilitate building and/or application of transformation templates to automate aspects of computer programming, e.g., to aid clients $110_{1-P}$ in editing, updating, replatforming, migrating, or otherwise acting upon their code bases $112_{1-P}$. In some implementations, training code 106 may include multiple different corpuses $108_{1-N}$ of source code that can be leveraged in this manner. These corpuses $108_{1-N}$ may be publicly available, proprietary, stored on a cloud, stored in a version control system (VCS), and so forth.

In some examples, one or more corpuses 108 of training code 106 may include pre-migration and post-migration versions of source code that exist prior to and after migration of the source code, respectively. For example, a VCS may store all or at least some previous versions of source code. Based on analysis of these pre- and post-migration versions of source code, transformation module 104 may identify one or more transformations made to the pre-migration version of the source code to yield the post-migration version of the source code. Transformation module 104 may then build a library 107 of transformation templates that are applicable subsequently to automate migration of new source code. In some implementations, library 107 may be configured as a lattice of transformation templates, although this is not required.

As used herein, a "transformation template" may include one or more rules for transforming a source code snippet. In some implementations, in a given transformation template, different tokens are replaced with what are referred to herein as "placeholders" or "wildcards," while other tokens are preserved. Transformation templates may be represented in various ways, such as pairs of code snippets, one predecessor and the other successor, and/or as pairs of graphs, again one predecessor and the other successor. In the latter case, subsequent source code to which the graph-based transformation template is to be applied may also be converted to graph form, such as an abstract syntax tree (AST) or control flow graph (CFG).

In some implementations, each client 110 may include an integrated development environment (IDE) 111 that can be used to edit/write source code. In other implementations, other applications may be used to edit source code, such as a simple text editor, a word processing application, a source code editor application with specific functionality to aid in computer programming, etc. Whether a programmer uses a standalone source code editor application or a source code editor module of an IDE 111, in many cases, the source code the programmer sees may be visually annotated, e.g., with different tokens being rendered in different colors to facilitate ease of reading. In some implementations, the source code editor may include extra functionality specifically designed to ease programming tasks, such as tools for automating various programming tasks, a compiler, real time syntax checking, etc. In some implementations, techniques described herein may enhance aspects of this extra functionality provided by a source code editor (whether a standalone application or part of an IDE), e.g., by generating and/or recommending code edit suggestions (e.g., to comport with prior successful transformations).

In various implementations, code knowledge system 102 may include a machine learning ("ML" in FIG. 1) module 105 that has access to data indicative of one or more trained machine learning models (not depicted). These trained machine learning models may take various forms, including but not limited to a graph-based network such as a graph neural network (GNN), graph attention neural network (GANN), or graph convolutional neural network (GCN), a sequence-to-sequence model such as an encoder-decoder, various flavors of a recurrent neural network ("RNN", e.g., long short-term memory, or "LSTM", gate recurrent units, or "GRU", etc.), and any other type of machine learning model that may be applied to facilitate selected aspects of the present disclosure.

In some implementations, ML module 105 may apply these machine learning models to source code transformations made previously in order to group the transformations into clusters of embeddings corresponding to semantically and/or syntactically similar source code transformations. For example, in various implementations, ML module 105 may apply a machine learning model such as a GNN or an encoder portion of an autoencoder to pre- and post-migration versions of a source code snippet to generate an embedding (or feature vector) representation of the transformation. When a graph-based machine learning model such as a GNN is applied, the source code transformation may be represented in the form of a graph, such as an AST or CFG. Various clustering techniques such as K-means clustering may be employed to group embeddings generated from source code transformations into clusters. In some implementations, transformation module 104 may then generate transformation templates on a cluster-by cluster basis. However, this is not meant to be limiting. In other implementations, transformation module 104 may generate transformation templates on an individual source code transformation basis.

To generate a transformation template for a given source code transformation or for a cluster of source code transformations, transformation module 104 may generate multiple different variations of candidate transformation templates, and then analyze these candidates against one or more criteria to determine whether and/or how effective they will be in automating similar transformations in other source code. For example, in some implementations, for a given candidate transformation template, transformation module 104 may generate a plurality of candidate transformation templates. With each candidate transformation template, different permutations of tokens of the transformation are replaced with placeholders. Transformation module 104 may then select one of the plurality of candidate transformation templates for inclusion in library 107 of transformation templates.

Transformation module 104 may select candidate transformation templates for inclusion in library 107 based on one or more criteria. These criteria may come in various forms. In some implementations, the criteria may include successful application of the candidate transformation template to a pre-migration version of a training source code snippet to accurately generate a post-migration version of the training source code snippet. In some such implementations, the success or failure of such an application may be dispositive. In other implementations, a count of transformations being implementable using the candidate transformation template may be considered when determining whether to select the candidate transformation for inclusion in library 107. And as will be described below, in some implementations, unsuccessful applications of a candidate transformation template may be identified during a "guard search" and used to identify counter-candidate transformation templates to handle these exceptions.

In some implementations, the criteria may include preservation of a programming language built-in keyword in the candidate transformation template, as opposed to "variabilization" of the programming language keyword. For example, suppose a source code transformation for which candidate transformation templates are being evaluated comprises changing "xrange(6)" to "range(6)." The following candidate transformations might be generated:

xrange(Z)→range(Z);
Z(6)→Y(6);
Z(X)→Y(X);

The first transformation may receive a score that is higher than the other two transformations because the programming language built-in keywords "xrange" and "range" are preserved. Intuitively, downstream application of transformation templates is less likely to depend on programmer-defined tokens (e.g., variable names, custom function names) than programming language keywords. In some implementations, an exception to this criterion may occur where a programming language built-in keyword is located within an outer call node, in which case the built-in keyword may be replaced with a placeholder.

Transformation module 104 may consider other criteria for selecting candidate transformation templates for inclusion in library 107. In contrast to the programming language built-in keyword criteria described previously, in some implementations, candidate transformation templates in which programmer-defined tokens are not replaced with placeholders (i.e., not variabilized) may receive a lower score or have their score decremented. In some implementations, the number of nodes in a graph (e.g., AST, CFG) that represents a transformation template may be considered as a coarse proxy for its length. In some such implementations, a score for such a transformation template may be decremented for each node in the rule. As yet another example, in some implementations, a rule that allows a variable to appear in a successor portion of a transformation template that did not appear on the predecessor portion of the transformation template may be penalized or even forbidden.

Figure 5:
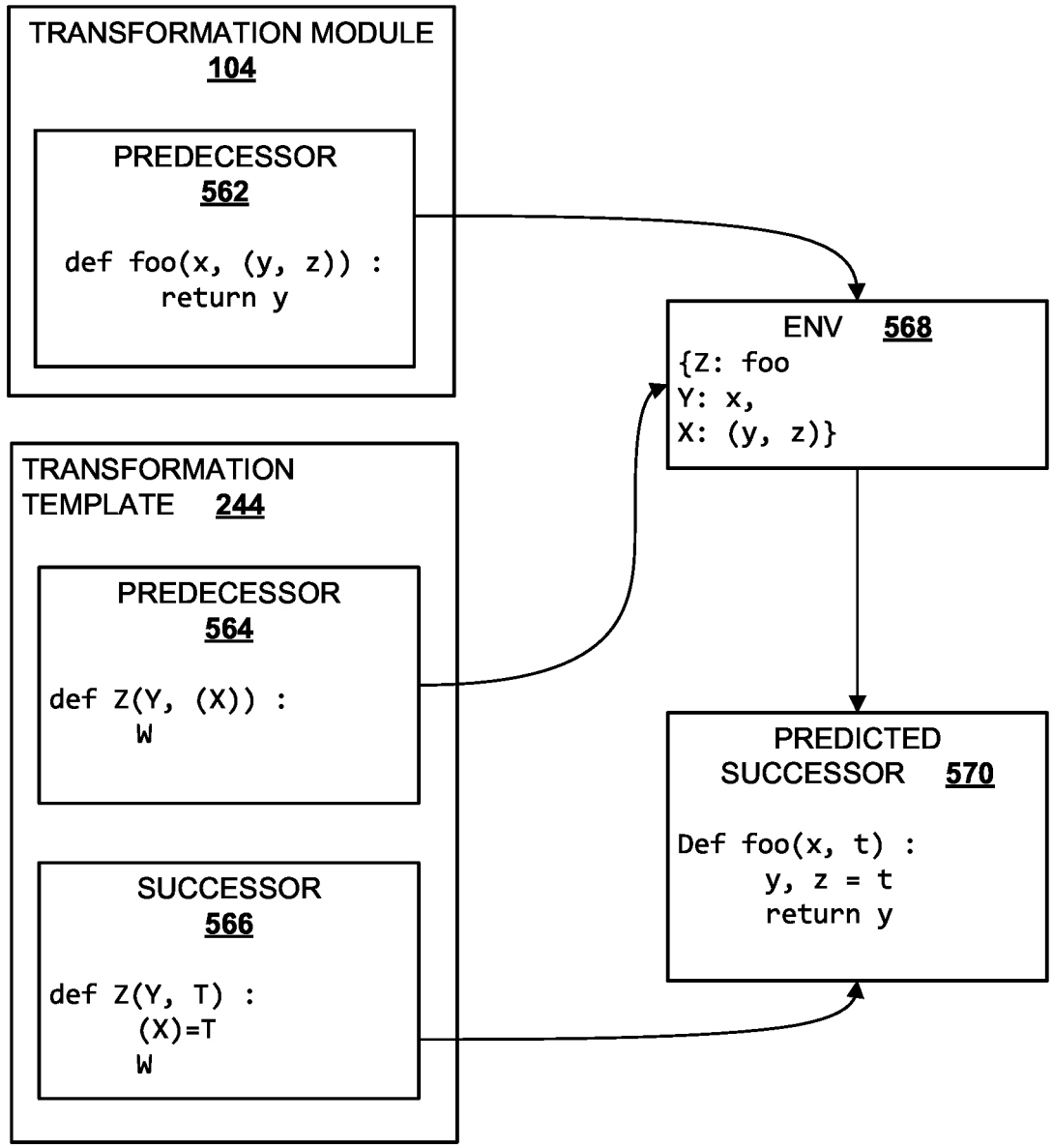
FIG. 5 depicts another example of how aspects of the present disclosure may be implemented, in accordance with various implementations.

Once library 107 is populated with transformation templates assessed against various criteria described previously, these templates may be applied subsequently to source code to automate the transformations. For example, the rule "xrange(X)range(X) may be applicable to any of the following source code snippets: "xrange(7)," "xrange(id)", "xrange(list(foo)[0])," etc. This may occur in batches, such that programmer(s) are presented with lists of changes and/or multiple changes are implemented automatically. Alternatively, the application may occur one-at-a-time, e.g., while a programmer operates IDE 111 to modify source code. FIG. 3 depicts one example of a graphical user interface that may be presented in accordance with techniques described herein. FIG. 5 schematically depicts one example of how application of a transformation template may be implemented.

FIG. 2 schematically demonstrates an example lattice pipeline 218 for building library 107 of transformation templates, in accordance with various implementations. Starting at top left, the input to the system is a collection 220 of source code transformations extracted from one or more source code files, such as from across a corpus of source code 108. In various implementations, the collection 220 of source code transformations may be collected in various ways, such as by aligning graphs (e.g., ASTs, CFGs) corresponding to pre- and post-migration source code and identifying aligned code snippets in which a transformation occurred. Each source code transformation may be represented in various ways, such as a pair of source code snippets, a pair of graphs (e.g., ASTs, CFGs) corresponding to source code snippets, etc. The output of lattice pipeline 218 is a plurality of transformation templates $244_{1-3}$ (three are provided here for illustrative purposes, any number of templates may be generated) that are stored in library 107 for future use to automate aspects of programming.

At block 222, the collection 220 of source code transformations may be grouped into clusters using various clustering techniques. In some implementations, each source code transformation in collection 220 may be processed, e.g., by ML module 105, to generate an embedding. If the source code transformations are in graph form, a graph-based machine learning model such as a GNN may be employed. In some implementations a combination of machine learning models may be applied to generate the embeddings. For example, a pure text-based encoder such as Bidirectional Encoder Representations from Transformers (BERT)-based transformer or word2vec may be used to transform each token/node into a vector, and a graph of those vectors (e.g., arranged in accordance with an AST or CFG of the underlying source code) may be processed using a GNN. In yet other implementations in which the source code transformations are represented textually (and not graphically), just a text-based encoder may be employed. Once the embeddings are generated, they may be grouped into clusters using any applicable clustering techniques for embeddings in embedding space, including but not limited to K-means clustering.

At block 224, one or more filters may be applied to weed out source code transformations that are not suitable for creation of transformation templates. These may include malformed source code transformations such as changes that encompass entire functions (which may be too large to generate a reliable transformation template) or which involve import statements.

As a result of the grouping of block 222 and the filtering at block 224, there may remain some number of raw source code transformations $226_{1-5}$ (five shown for illustrative purposes, any number may result) for further processing by lattice pipeline 218. For each raw source code transformation 226, at block 228, generalization processing may occur. In some implementations, and as indicated by the parallel arrows in FIG. 2, this generalization 228 may occur in parallel across multiple raw source code transformations $226_{1-5}$, although this is not required. For purposes of explanation, only one such parallel processing pipeline will be described here, but the process may be the same for each raw source code transformation 226.

During the generalization processing 228, raw source code transformation 226, which may include a predecessor snippet/graph and a successor snippet/graph, may be generalized in multiple different ways into a plurality of candidate transformation templates $230_{1-3}$ (three are shown in FIG. 2 but any positive number of candidates is possible). At block 234, each of these candidate transformation templates $230_{1-3}$ may be assessed, e.g., by transformation module 104, against one or more the criteria mentioned previously. The assessment block 234 is only illustrated for first candidate transformation template $230_1$ for the sake of simplicity, but the same assessment would occur, e.g., in parallel, for all candidate transformation templates $230_{1-3}$.

In some implementations, at block 232, a "guard search" also may be performed with candidate transformation templates $230_{1-3}$. During the guard search 232, transformations that should not occur, in spite of the candidate transformation template 230 otherwise being applicable, may be identified. This may result in a list of "do not apply" conditions being established for one or more of candidate transformation templates $230_{1-3}$. In some implementations, the guard search procedure 232 discovers these "do not apply" conditions by applying the candidate transformation template to training code 106 to detect incorrect/failed transformations, and generalizing these contexts using the same generalization procedure described herein.

In some implementations, output of the assessment of block 234 may be analyzed by a scoring block 236 to assign candidate transformation templates $230_{1-3}$ corresponding scores $238_{1-3}$. As noted above, in some implementations, this score 238 may be incremented or decremented based on assessment of each candidate transformation template 230 against the various criteria described previously. In some implementations, one or more candidate transformation templates 230 may be selected, e.g., by transformation module 104, based on scores $238_{1-3}$. For example, in FIG. 3, scores $238_{1-3}$ are processed using an argmax function 240 to select what will be referred to herein as a "selected" transformation template 241 from candidate transformation templates $230_{1-3}$. As noted above, this process of guard searching (232), assessment (234), scoring (236), and selecting (via argmax 240) are performed for each candidate transformation template 230. Thus, a plurality of selected transformation templates $241_{1-5}$ are generated for, and correspond to, the plurality of raw source code transformations $226_{1-5}$.

In some implementations, at block 242, an inter-transformation selection process may be performed on selected transformation templates $241_{1-5}$ to further whittle down the number of subsequently-applicable transformation templates to a final set of usable transformation templates $244_{1-3}$. This whittling down may include deduplication of identical transformation templates and/or elimination of selected transformation templates 241 that are subsumed by other transformation templates. These usable transformation templates $244_{1-3}$ may then be stored in library 107 (e.g., as a lattice structure) for future use in automating aspects of computer programming.

FIG. 3 depicts an example GUI that may be presented to a user to recommend one or more auto edits, and for facilitating navigation to relevant portions of source code for potential transformation. In this example, a number of instances of source code that match various transformation templates have been identified in a codebase. For example, the file "foo.cc" includes two instances of source code that match two different transformation templates: a first instance that matches a transformation template that transforms the function call "xrange" to "range" while preserving (via the placeholder X) argument(s) that are passed to the function; and a second instance that matches a transformation template that wraps a KEYS call in a LIST call. Similarly, the file "bar.cc" also includes a number of applicable transformations. In various implementations, the programmer may be able to select (e.g., click) any of the filenames and/or the instances of applicable transformation templates to be taken directly to the corresponding locations in source code. In various implementations, these transformations may be implemented automatically, or the user may have the option of accepting them, rejecting them, and/or modifying them.

Figure 4:
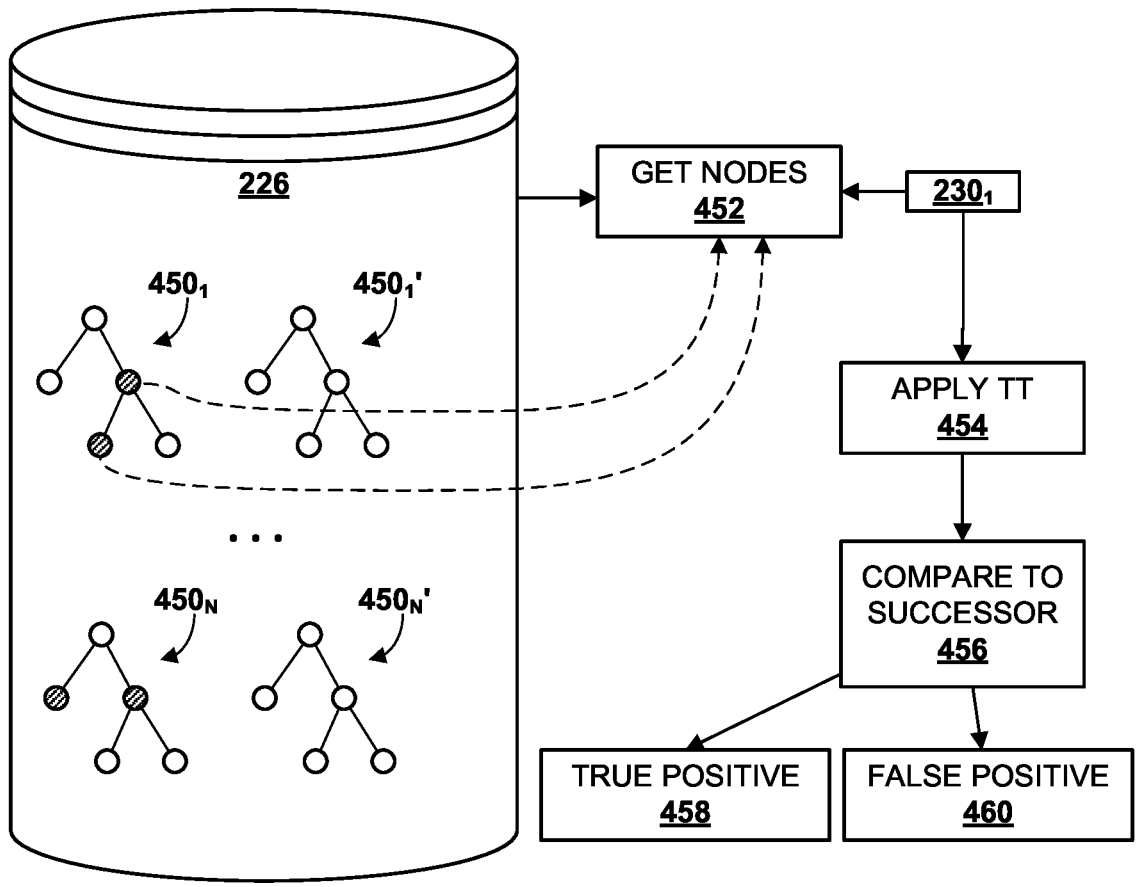
FIG. 4 depicts another example of how aspects of the present disclosure may be implemented, in accordance with various implementations.

FIG. 4 schematically depicts a non-limiting example of how N (positive integer) training source code transformations may be used to assess (block 234 in FIG. 2) candidate transformation templates 230. In FIG. 4, each training source code transformation is represented as a predecessor AST 450 and a successor AST 450'. In other implementations, training source code transformations may be represented in other ways/data structures.

At block 452, nodes of first predecessor AST $450_1$ are selected, as indicated by the dashed arrows. A first candidate transformation template ("TT" in FIG. 4) $230_1$ is also selected. At block 454, first candidate transformation template $230_1$ is applied to the selected nodes of first predecessor AST $450_1$ to generate a transformed AST (not depicted). At block 456, the transformed AST is compared to first successor AST $450'_1$ to evaluate the accuracy of the transformation. If the transformation was accurate, a true positive may be output at block 458. In some implementations, this may result in a score associated with first candidate transformation template $230_1$ being incremented (or at least not decremented). If the transformed AST differs from first successor AST $450'_1$, then a false positive may be output at block 460. In some implementations, this may result in a score associated with first candidate transformation template $230_1$ being decremented.

FIG. 5 schematically depicts a non-limiting example of how a transformation template 244 may be applied to predict a successor source code snippet 570 from a predecessor source code snippet 562, e.g., during inference. Placeholders/variables of predecessor portion 564 of transformation template 244 may be bound to token(s) of predecessor source code snippet 562 at block 568. For example, the placeholder Z is bound to the programmer-defined function name "foo." The placeholder Y is bound to the programmer-defined variable x. And the placeholder X is bound to the programmer-defined variables (y, z). Once the placeholders of predecessor portion 564 of transformation template 244 are bound, successor portion 566 of transformation template 244 may be applied to these bindings to generate predicted successor source code snippet 570. The resulting prediction is shown in FIG. 5 at 570.

Figure 6:
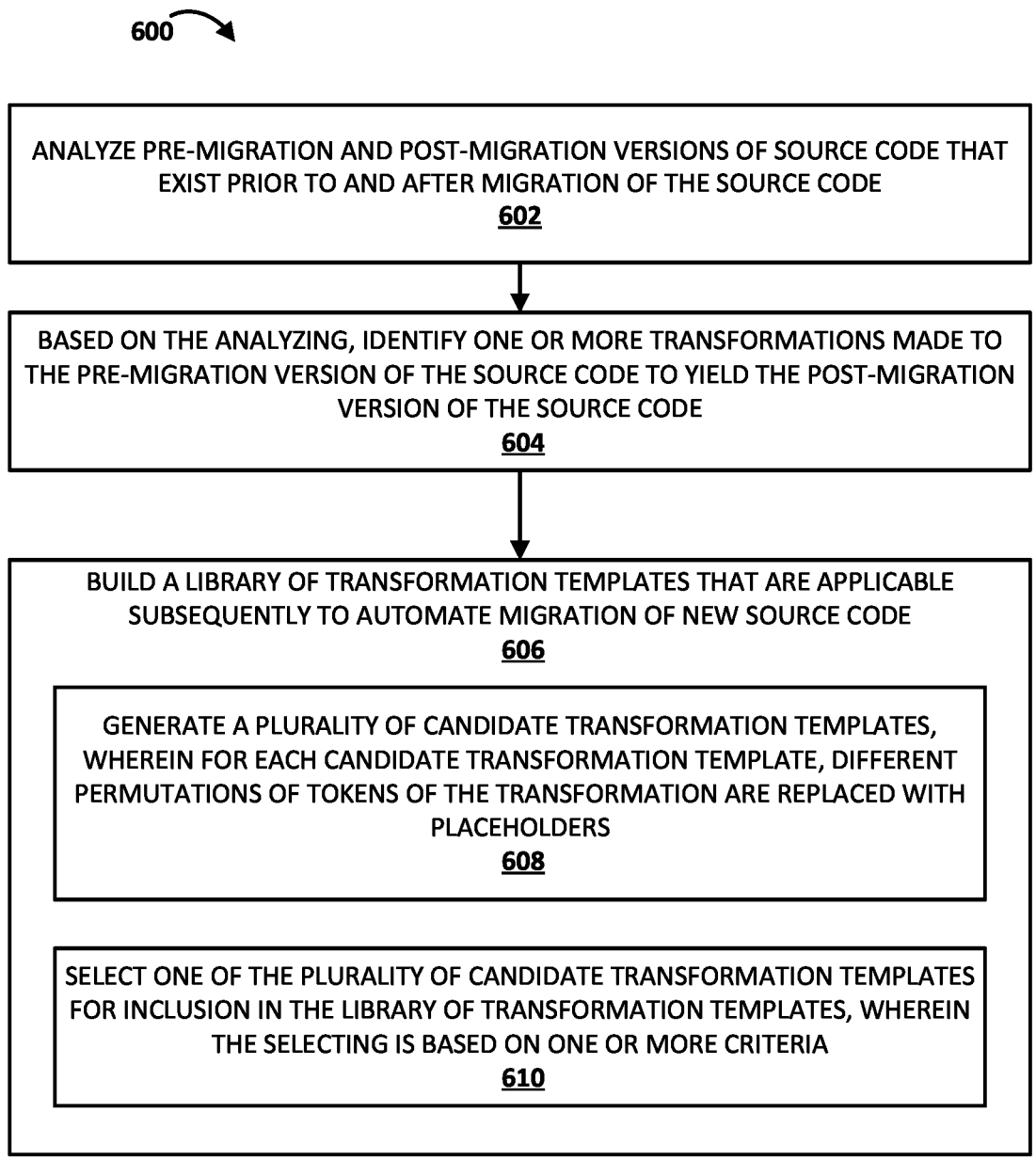
FIG. 6 depicts a flowchart illustrating an example method for practicing selected aspects of the present disclosure.

FIG. 6 is a flowchart illustrating an example method 600 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 600 are shown in a particular order, this is not meant to be limiting. One or more operations may be reordered, omitted or added.

At block 602, the system may analyze pre-migration and post-migration versions of source code (also referred to herein as predecessor and successor versions herein) that exist prior to and after migration of the source code. In some implementations, this analysis may include aligning source code snippet(s) in the pre-migration version with corresponding source code snippet(s) in the post-migration version, e.g., using ASTs, CFGs, or other techniques. Based on the analyzing, at block 604, the system may identify one or more transformations (e.g., raw source code transformations $226_{1-5}$ in FIG. 2) made to the pre-migration version of the source code to yield the post-migration version of the source code. Although not shown in FIG. 6, in some implementations, these source code transformations may be grouped into clusters, e.g., based on embeddings generated from the transformations using machine learning models such as GNNs and/or transformers.

At block 606, the system may build a library (e.g., 107) of transformation templates e.g., $244_{1-3}$) that are applicable subsequently to automate migration of new source code. The building of block 606 may be implemented in various ways.

For example, at block 608, for one or more of the transformations (or for a cluster of transformations in some cases), a plurality of candidate transformation templates (e.g., $230_{1-3}$ in FIG. 2) may be generated. In some implementations, for each candidate transformation template, different permutations of tokens of the transformation may be replaced with placeholders.

At block 610, the system may select one of the plurality of candidate transformation templates for inclusion in the library of transformation templates. This selection may be based on an assessment (e.g., block 234 in FIG. 2) that is performed against one or more criteria. Example criteria were described previously, and may include, but are not limited to, preservation of programming language built-in keywords, variabilization of programmer-defined tokens, a count of the transformations being implementable using the candidate transformation template, and so forth.

Figure 7:
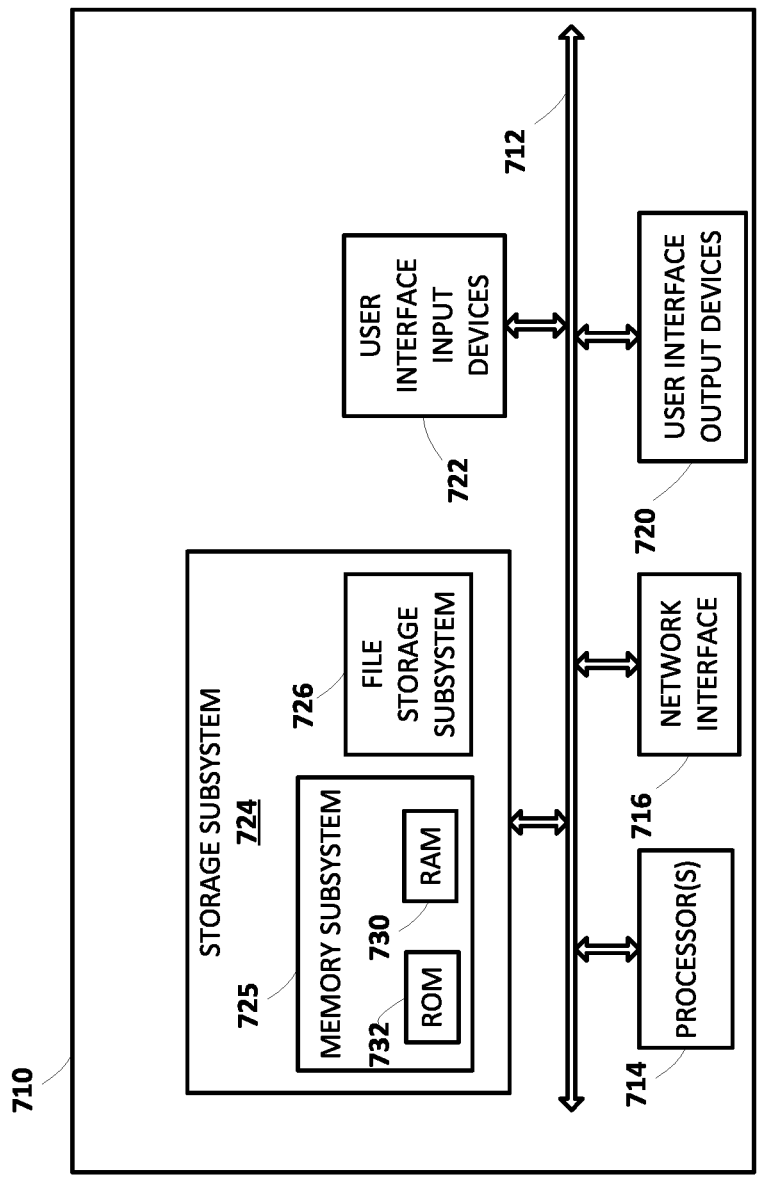
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 6, as well as to implement various components depicted in FIGS. 1-2 and 4-5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
    analyzing pre-migration and post-migration versions of source code that exist prior to and after migration of the source code;
    based on the analyzing, identifying one or more transformations made to the pre-migration version of the source code to yield the post-migration version of the source code; and
    building a library of transformation templates that are applicable subsequently to automate migration of new source code, wherein the building includes, for one or more of the transformations:
        generating a plurality of candidate transformation templates, wherein for each candidate transformation template, different permutations of tokens of the transformation are replaced with placeholders, and selecting one of the plurality of candidate transformation templates for inclusion in the library of transformation templates, wherein the selecting is based on one or more criteria.

2. The method of claim 1, wherein the library comprises a lattice of transformation templates.

3. The method of claim 1, wherein the one or more criteria include successful application of the candidate transformation template to a pre-migration version training source code snippet to accurately generate a post-migration version of the training source code snippet.

4. The method of claim 1, wherein the one or more criteria include preservation of a programming language keyword in the candidate transformation template.

5. The method of claim 1, wherein the one or more criteria include a count of the transformations being implementable using the candidate transformation template.

6. The method of claim 1, wherein the one or more transformations comprise a plurality of transformations, and the method further includes:
grouping the plurality of transformations into a plurality of clusters;
generating a plurality of candidate transformation templates for a given cluster of the plurality of clusters, and
selecting, based on one or more of the criteria, one of the plurality of candidate transformation templates generated for the given cluster for inclusion in the library of transformation templates.

7. The method of claim 6, wherein the grouping includes encoding each transformation of the plurality of transformations into an embedding.

8. The method of claim 7, wherein the encoding is based on a transformer network and a graph neural network (GNN).

9. The method of claim 1, wherein one or more of the transformations includes contextual code surrounding the transformation.

10. The method of claim 1, further comprising:
analyzing a pre-migration version of the new source code to match one or more transformation templates from the library to one or more snippets of the new source code; and
applying the matched one or more transformation templates to the one or more snippets of the new source code to generate a post-migration version of the new source code.

11. A system comprising one or more processors and memory storing instructions that, in response to execution of the instructions by the one or more processors, cause the one or more processors to:
analyze pre-migration and post-migration versions of source code that exist prior to and after migration of the source code;
based on the analysis, identify one or more transformations made to the pre-migration version of the source code to yield the post-migration version of the source code; and
build a library of transformation templates that are applicable subsequently to automate migration of new source code, wherein the instructions to build include, for one or more of the transformations, instructions to:
generate a plurality of candidate transformation templates, wherein for each candidate transformation template, different permutations of tokens of the transformation are replaced with placeholders, and
select one of the plurality of candidate transformation templates for inclusion in the library of transformation templates, wherein the selecting is based on one or more criteria.

12. The system of claim 11, wherein the library comprises a lattice of transformation templates.

13. The system of claim 11, wherein the one or more criteria include successful application of the candidate transformation template to a pre-migration version training source code snippet to accurately generate a post-migration version of the training source code snippet.

14. The system of claim 11, wherein the one or more criteria include preservation of a programming language keyword in the candidate transformation template.

15. The system of claim 11, wherein the one or more criteria include a count of the transformations being implementable using the candidate transformation template.

16. The system of claim 11, wherein the one or more transformations comprise a plurality of transformations, and the instructions include instructions to:
group the plurality of transformations into a plurality of clusters;
generate a plurality of candidate transformation templates for a given cluster of the plurality of clusters, and
select, based on one or more of the criteria, one of the plurality of candidate transformation templates generated for the given cluster for inclusion in the library of transformation templates.

17. The system of claim 16, further comprising instructions to encode each transformation of the plurality of transformations into an embedding.

18. The system of claim 17, wherein the encoding is based on a transformer network and a graph neural network (GNN).

19. The system of claim 11, wherein one or more of the transformations includes contextual code surrounding the transformation.

20. A non-transitory computer-readable medium comprising instructions that, in response to execution of the instructions by a processor, cause the processor to:
analyze pre-migration and post-migration versions of source code that exist prior to and after migration of the source code;
based on the analysis, identify one or more transformations made to the pre-migration version of the source code to yield the post-migration version of the source code; and
build a library of transformation templates that are applicable subsequently to automate migration of new source code, wherein the instructions to build include, for one or more of the transformations, instructions to:
generate a plurality of candidate transformation templates, wherein for each candidate transformation template, different permutations of tokens of the transformation are replaced with placeholders, and
select one of the plurality of candidate transformation templates for inclusion in the library of transformation templates, wherein the selecting is based on one or more criteria.

* * * * *